Oct. 13, 1936. J. T. DICKSON 2,057,422
BRAKE
Filed June 4, 1934 2 Sheets-Sheet 1

Inventor:
James T. Dickson,
by: Bradbury
Attorney.

Oct. 13, 1936.  J. T. DICKSON  2,057,422
BRAKE
Filed June 4, 1934  2 Sheets-Sheet 2
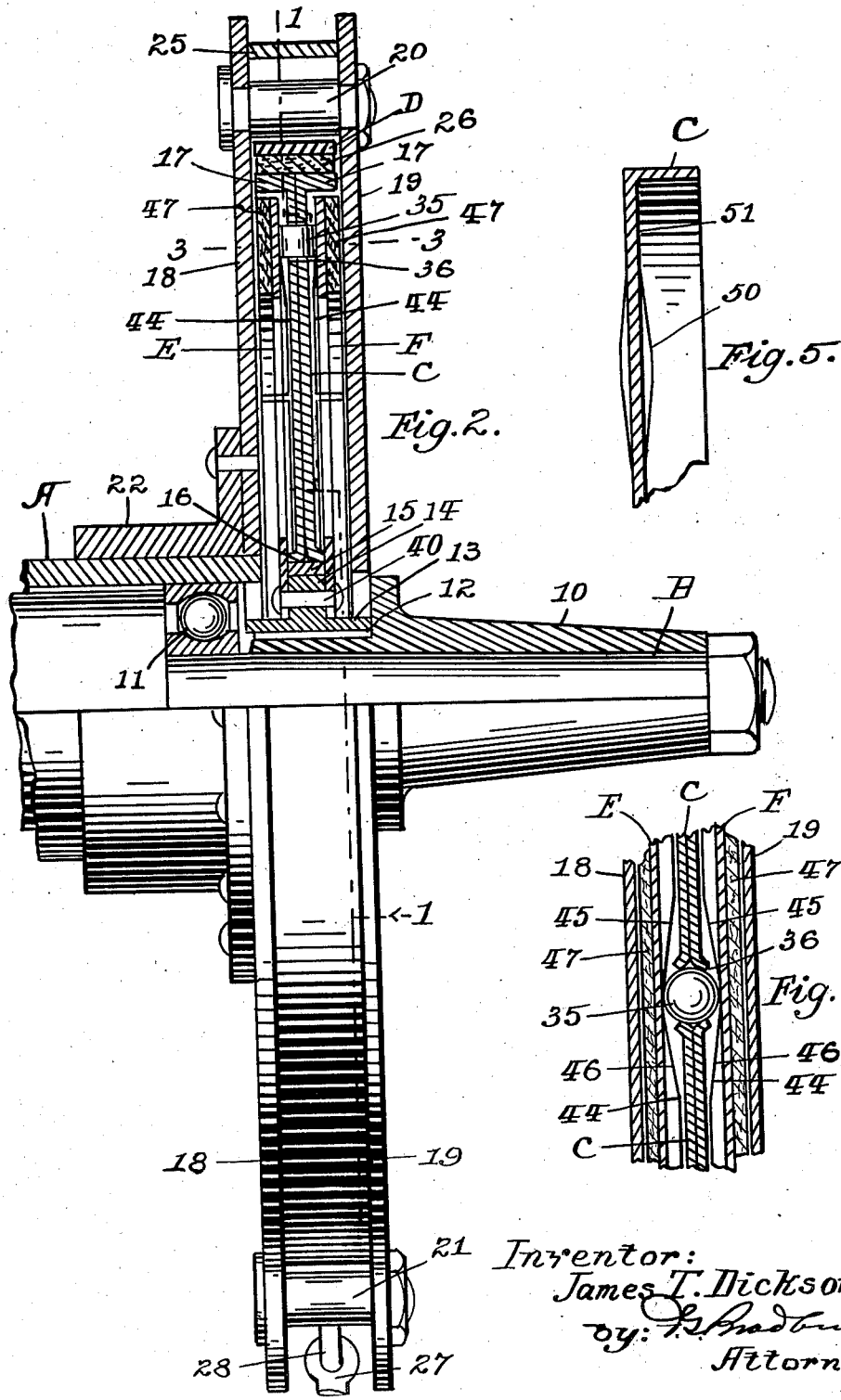
Inventor:
James T. Dickson,
by: [signature]
Attorney.

Patented Oct. 13, 1936

2,057,422

UNITED STATES PATENT OFFICE 2,057,422

BRAKE

James T. Dickson, Los Angeles, Calif.

Application June 4, 1934, Serial No. 728,950

14 Claims. (Cl. 188—140)

My invention relates to a brake in which a primary couple composed of a stationary element and a revoluble element to be retarded in revolution have braking action applied thereto by the use of means in which braking medium is applied by the revoluble effort of a brake drum or its equivalent and thereafter through the effort of cam action. More specifically my invention relates to a brake in which a torsional braking medium is converted into lateral braking action in opposite directions through intervening cam action. Through the use of my invention, braking medium having lateral spreading action and having maximum frictional surface area is produced. The invention is particularly characterized by the use of cam actuating means interposed between a brake drum, constituting part of a cam applicator and a pair of laterally disposed friction elements constituting part of a primary brake element, whereby the friction elements are spread and a powerful effort is applied by slight effort of the operator. By the combination of forces thus brought into play I have produced a simple and efficient brake by which maximum braking action is produced, the parts are substantially not subject to disorder, wear is reduced to a minimum and sensitiveness of operation is increased and which is inexpensive in construction. Also I have produced an assemblage of elements which affects a maximum of braking effort in a minimum width of space, thus making the structure advantageous in modern automobile practice.

To these ends my invention comprises the features of construction and combination of parts hereinafter described and claimed.

Figure 1:
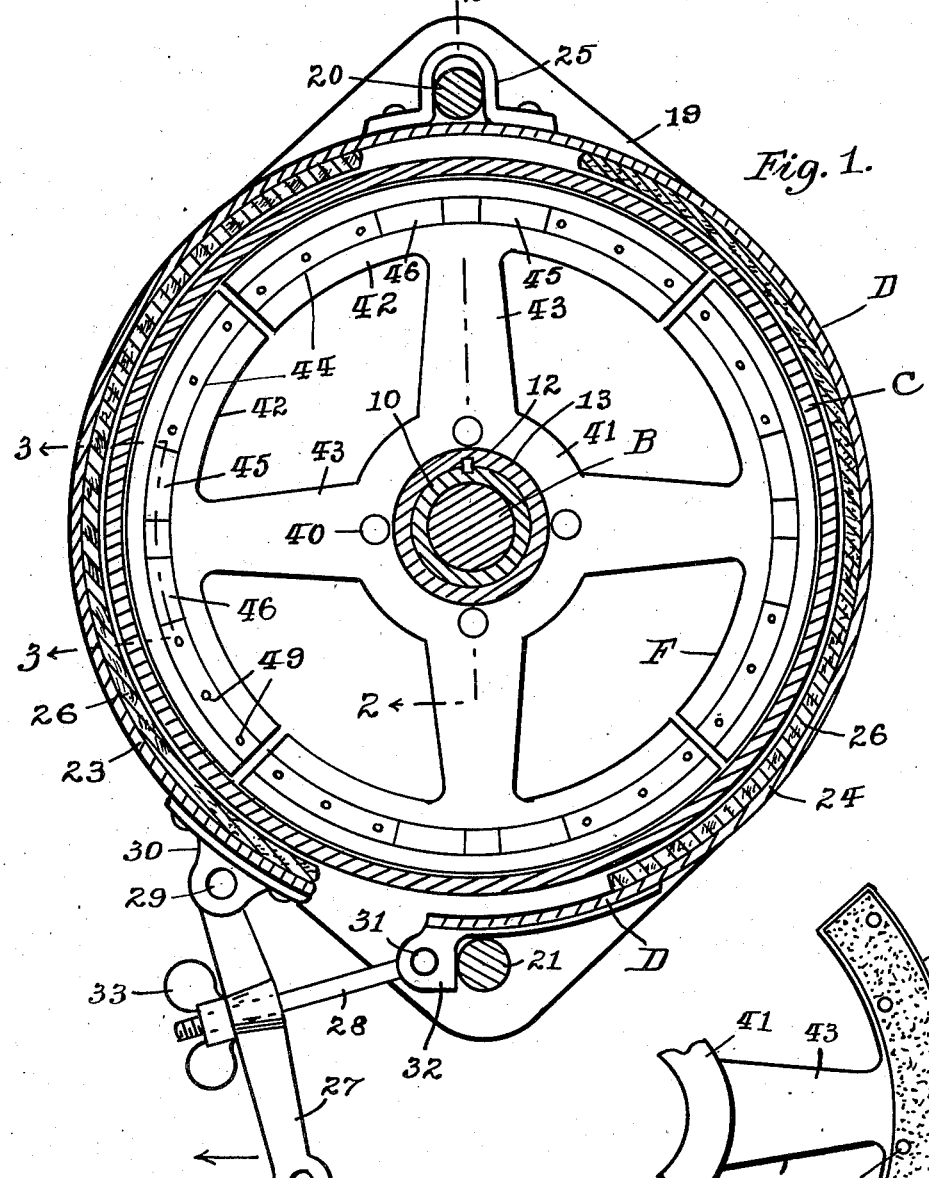
Figure 4:
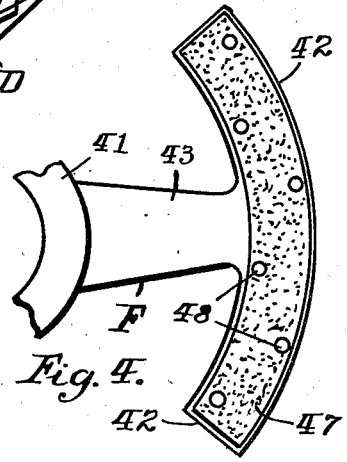

In the accompanying drawings forming part of this specification, Fig. 1 is an elevation, partly in section of my invention, that portion in section being taken on line 1—1 of Fig. 2; Fig. 2 is a section taken on the line 2—2 of Fig. 1; Fig. 3 is a section of a detail taken on line 3—3 of Fig. 1 and Fig. 2; Fig. 4 is a side elevation of a detail portion of part of the primary braking element, and Fig. 5 is a section of a detail of the cam applicator brake drum showing an alternative construction of cam actuating element.

In the drawings, A indicates the stationary element, resembling an axle housing and B the revoluble element, resembling a shaft upon which the wheel hub 10 is secured, said elements being coaxially arranged and constituting a primary couple to which my improved brake is shown applied. In this couple the shaft B is journaled in housing A, by an ordinary antifriction bearing 11. Upon hub 10 is rigidly secured by spline 12, a collar 13 which has an annular shoulder 14 and upon said shoulder is journaled a brake drum bushing 15. This bushing is set in the cam applicator drum C, thus journaling the drum on said collar. Drum C consists as shown of a pair of disks lying flat and secured together by spot welding or any other suitable means and formed near their center with outturned annular bearing flanges 16 resting upon the bushing and at their peripheries with outturned annular flanges 17, the latter forming a friction drum surface.

Arranged about the cam applicator brake drum C is a brake housing which forms the stationary friction brake element of what I have chosen to turn the primary brake. This housing comprises a pair of rigid plates 18 and 19 which are held spaced apart by the spacing bolts 20 and 21 of any number desired or by any other suitable means. One of the disks 18 is rigidly fastened to an annular flanged collar 22 which is brazed or fastened by any suitable means to the stationary element A of the primary couple and the other 19 terminates centrally free from hub 10 to permit free revolution of the latter.

A torsional brake band D, having circular members 23 and 24 arranged to freely embrace the brake drum by contraction is freely pivoted by the yoke 25 on bolt 20. The inner face of said brake band is lined in the usual manner with friction facing 26. The brake band members 23 and 24 are contracted upon the drum, by the use of suitable means, said means as shown consisting of a toggle which is composed of a lever arm 27 for connection with any well known suitable toggle actuating means (not shown) and an adjustable link bolt 28. Said arm is pivoted by pin 29 and clip 30 to member 23 and link bolt 28 is pivoted at one end by pin 31 to a stop 32 on member 24 and is adjustably fastened to lever 27 by the threaded wing nut 33. Normally, while the brake band is unapplied, the stop 32 rests freely against bolt 21 but is free to be drawn with the band into brake applied condition when the toggle mechanism is tightened. Thus by tilting the lever arm 27 in the direction of the arrow shown in Fig. 1, the brake band is contracted and friction applied to the surface of the drum as the latter revolves, thus tending to stop the drum. By subsequently releasing said arm 27, the brake band expands by its own outward spring tendency.

The outer portion of the body away from the center of the brake drum has a plurality of cam rollers 35 arranged in retaining openings 36, through the body wall of the drum, which are equally distanced circumferentially and in a circle concentric with the axis of the primary couple to which my improved brake is applied. These cam rollers are freely rotatable on axes radiating from the axis of the stationary and revoluble members of the primary couple.

Secured rigidly by rivets 40 or other suitable means to the opposite sides of shoulder 14 of the revoluble collar 13 are two similar spring brake disks E and F, each of which has a hub portion 41, and a concentric band divided into articulated segments 42, each segment being supported by a radiating arm or spoke 43. Each of the inner faces of the segments is provided with a cam 44 having a pair of oppositely disposed inclined cam faces 45 and 46, between which a companion cam roller 35 or other cooperating cam actuator is disposed. The segments of one brake disk E are placed opposite coresponding segments on the companion disk so that the cam actuating element will function on a pair of segments simultaneously. When the cam actuating brake drum is retarded by the contraction of the brake band 26, said segments are spread or deformed laterally against the spring action of the segment supporting arms 43 of the disks by the cam rollers and apply primary braking action. When the drum is released, said cam rollers retract and said segments are returned by the spring tendency of said supporting arms 43, leaving the brake disks E and F unapplied. The outer surface of each segment of each primary brake disk has a brake friction surface 47 secured thereto by rivets 48 or by any well known attaching means and these friction surfaces 47 normally revolve with the spring brake disks E and F free from the inner faces of the stationary brake disks 18 and 19.

In operation the drum normally is forced to revolve with the primary spring brake disks when the brake is unapplied, through contact of the cams against the cam actuating rollers. To apply braking action torsional strain is applied by contracting the brake band 26 upon the drum and immediately the cam rollers are forced to ascend the cams and spread the spring brake disk segments and impress the friction brake surfaces 47 against the inner opposite faces of the stationary brake plates 18 and 19, thus applying primary braking action and stopping or reducing the revolution of the revoluble member 10 of the primary couple. The spring tendency of the disks assists the return of said disks to normal unapplied position, also for this purpose the inclination of the cam surfaces is beyond the angle factor of friction for the same purpose.

The inward inclination from opposite directions of the inclined surfaces 45 and 46 of each pair of members of each cam unit causes braking action to be applied when the revoluble member of the primary couple is revolved in either forward or backward direction and the particular assemblage of parts provides greatly increased braking power due to the greatly increased friction surfaces on the primary brake disks E and F over that provided by the drum alone. Also the effort applied by the cam actuating torsional brake drum is comparatively very slight as compared with the braking effort afforded by the spreading action of the primary brake disks E and F and the width of the entire assemblage can thereby be confined to very limited dimensions which is an advantage in modern automobile practice.

The cams on the primary disk segments can be fastened thereto by rivets 49 or by any other suitable means. In Fig. 5 I have indicated a single element cam actuating brake drum 51 constructed with a double integral cam element 50, as the equivalent of the brake drum C and rollers 35 shown in Fig. 2. Other modifications of like character are also contemplated in the invention.

In accordance with the patent statutes, I have described the principles of operation of my invention, together with the construction thereof which I now consider to represent the best embodiment thereof, but I desire to have it understood that the structure shown is only illustrative and that the invention can be carried out by other means and applied to uses other than those above set forth within the scope of the following claims.

Having described my invention, what I claim as new and desire to secure by Letters Patent is:

1. A brake, comprising, a fixed element having a plurality of side plates normally spaced apart, a revoluble element having friction elements coaxial with and between said plates, said friction elements being movable apart into frictional engagement with said plates and provided with cam surfaces on their backs, rotary cam means adapted to cooperate with said cam surfaces for spreading said friction elements and an applicator associated with said cam means between said friction elements to thereby effect cam action to retard the revolution of said revoluble element.

2. A brake, comprising, a fixed element having a pair of stationary side plates normally spaced apart, a revoluble element having resilient revoluble friction plates coaxial with and adapted to be deformed apart into frictional engagement with said side plates and provided with cam surfaces on their backs, revoluble cam cooperating means adapted to coact with said cam surfaces for deforming said resilient plates, and an applicator associated with and adapted to actuate said cam cooperating means.

3. A device of the character set forth, comprising, a fixed element having a side plate, a revoluble element coaxial with and having a resilient plate provided with a cam surface on its back and adapted to be deformed into frictional engagement with said side plate, rotatable cam cooperating means adjacent to said cam surface and adapted by retarded revolution to deform said resilient plate, a rotatable applicator coaxial with said revoluble element adapted normally to rotate with said revoluble element and having a drum, and friction means applicable to said drum to retard revolution of the applicator to actuate said cam cooperating means.

4. A device of the character set forth, comprising, a fixed element having side disks spaced apart from each other, a revoluble element having a pair of friction disks spaced apart from each other, movable into and out of frictional engagement and coaxial with said side disks and provided with cam surfaces on their backs, cam cooperating means freely rotatable about said axis adapted by retarded revolution to coact with said cam surfaces and actuate said friction disks into coaction with said side disks, an applicator freely rotatable about said axis adapted by retarded rotation to effect the application of said cam cooperating means to actuate said friction disks and having a drum concentric with said axis, and means applicable to the periphery of said drum to retard its revolution and thereby effect the functioning of said applicator.

5. A brake, comprising, a fixed element having a pair of side faces spaced apart from each other, a revoluble element having resilient plates interposed between and deformable into coaction with said side faces and provided with cam surfaces on their backs, cam actuating means between and adapted to cooperate with said cam surfaces and deform said friction plates against said side faces, and a rotary cam applicator between said friction plates having a drum and adapted when the drum is retarded against revolution to apply through the deforming of said friction plates braking action against the inwardly facing sides of said friction plates.

6. In combination with the revoluble and stationary members of a primary couple, said stationary member having a pair of opposed brake plates spaced apart from each other, and said revoluble member having a pair of resilient friction plates concentric with said opposed stationary plates, provided with cam surfaces on their backs and movable into and out of frictional engagement with said opposed plates, a revoluble brake drum between said opposed brake plates having means for retarding its revolution, and cam cooperating means within said drum interposed between said resilient members and adapted to coact with said cam surfaces and by retarding the revolution of the drum to spread said friction plates into coaction with said stationary plates.

7. A machine element, comprising, a plate having a friction face disposed in a plane at right angles to an axis therethrough, a revoluble disk coaxial with said plate having resilient radiating members normally adjacent to and out of frictional engagement with the friction surface of said plate and provided with cam surfaces on their backs, cam means associated with said cam surfaces for deforming the resilient members into frictional engagement with said plate, an applicator coaxial with said disk and plate and freely rotatable with the disk, said applicator being adapted by retarding its revolution to actuate said cam means and thereby cause the resilient radiating members to frictionally engage said plate, and means for retarding the revolution of said applicator.

8. A machine element, comprising, a plate having a friction face disposed in a plane at right angles to an axis therethrough, a revoluble disk coaxial with said plate having radiating members and resilient friction segments thereon normally adjacent to and out of frictional engagement with the friction surface of said plate and provided with cam surfaces on their backs, cam means associated with said cam surfaces for deforming said radiating arms and thereby urging the segments into frictional engagement with said plate, an applicator coaxial with said disk and plate and freely rotatable with the disk, said applicator being adapted by retarding its revolution to actuate said cam means and thereby cause the resilient segments to frictionally engage said plate, and means for retarding the revolution of said applicator.

9. A brake, comprising, a stationary member having a pair of plates provided with inner friction faces spaced apart from each other and disposed in planes at right angles to a common axis, a revoluble member coaxial with said plates having a pair of disks provided with resilient members adjacent to but normally out of connection with the friction faces of said plates, said resilient members being disposed in pairs and provided with cam surfaces on their backs, the members of each pair being substantially opposite one another so that by spreading them apart against their spring tendency they are caused to function, cam elements cooperating with said cam surfaces for spreading the members of each pair of resilient members, a freely rotatable applicator coaxial with said plates and disks and common to all of the cam elements for actuating the cam elements to spread the resilient members, and friction means for retarding the revolution of the applicator to actuate the cam elements.

10. In combination with the revoluble and stationary members of a primary couple to which braking action is to be applied, one of said members having opposed brake plates spaced apart, a revoluble brake drum having means for applying braking action thereto and interposed between said plates, a pair of brake disks carried by the other member of said couple, said disks being movably disposed to be spread into frictional engagement with said plates to apply braking action, and means cooperating with said drum and disks having cam action applicable by retarding the revolution of said drum for spreading said disks.

11. In combination with the revoluble and stationary members of a primary couple to which braking action is to be applied, the stationary member of said couple having opposed brake plates spaced apart, a revoluble brake drum having means for applying braking action thereto and interposed between said plates, a pair of brake disks carried by the revoluble member of said couple and movably disposed to be spread into coaction with said opposed plates to apply braking action, and means cooperating with said drum and disks having cam action applicable by retarding the revolution of said drum to spread said disks.

12. In combination with the revoluble and stationary members of a primary couple to which braking action is to be applied, the stationary member of said couple having opposed brake plates spaced apart, a revoluble brake drum, a pair of resilient brake disks carried by the revoluble member of said couple and disposed between and adapted to be spread into coaction with said opposed plates to applying braking action, means for retarding the revolution of said drum, and means including cam mechanism between the drum and disks adapted by the inactive tendency of said drum to deform and spread said disks.

13. In combination with the revoluble and stationary members of a primary couple to which braking action is to be applied, a pair of brake disks carried by and rotatable with the rotating member of said couple having flexible members adapted to be spread, opposed rigid brake plates supported by the stationary member of said couple with which said flexible members of said disks are adapted to cooperate by spreading and applying braking action to the revoluble member of said couple, a brake drum rotatable with said disks and free to be retarded in revolution independently of said disks, means for applying braking action to the periphery of said drum, and cam actuating means applied to the sides of said drum and disks adapted by the braking action applied to said drum to transmit braking action through the spread of said disks against the sides of said plates and thence to the revoluble member of said couple.

14. A brake, comprising, a stationary axle housing having opposed transverse brake plates spaced apart, a wheel hub journaled to revolve upon said housing, a collar carried by said hub having a pair of disks spaced apart between said plates, said disks having resilient segments provided with friction faces adjoining the inner opposite faces of the brake plates, said segments being adapted by spreading action to engage said plates by their friction faces, a pair of double cams upon the inner face of each segment, the pair of cams on one segment of a disk being opposite a companion pair of cams on a segment of the other disk, cam actuating rollers disposed between the companion pairs of cams, a cam applicator freely journaled upon said collar between said discs having a brake drum and carrying said roller whereby when the drum is retarded against revolution the rollers coact with the cams and expand said disks into frictional engagement with said plates, and a brake band for retarding the revolution of said drum.

JAMES T. DICKSON.